US006616741B1

(12) United States Patent
Sawa et al.

(10) Patent No.: US 6,616,741 B1
(45) Date of Patent: Sep. 9, 2003

(54) AQUEOUS METALLIC INK COMPOSITION

(75) Inventors: Tomohiro Sawa, Osaka (JP); Yuki Yamamoto, Yamatokoriyama (JP)

(73) Assignee: Sakura Color Products Corp., Osaka (JP)

( * ) Notice: Subject to any disclaimer, the term of this patent is extended or adjusted under 35 U.S.C. 154(b) by 0 days.

(21) Appl. No.: 09/615,421

(22) Filed: Jul. 13, 2000

(30) Foreign Application Priority Data

Jul. 13, 1999 (JP) ............................................. 11-198929

(51) Int. Cl.⁷ ................................................ C09D 11/00
(52) U.S. Cl. ................. 106/31.68; 106/31.86; 106/31.58; 106/31.28
(58) Field of Search ........................ 106/31.68, 31.86, 106/31.58, 31.28

(56) References Cited

U.S. PATENT DOCUMENTS 4,490,177 A * 12/1984 Shioi et al. ................. 106/1.05
4,545,819 A * 10/1985 Shioi et al. ................. 106/1.05
4,604,139 A * 8/1986 Shioi et al. ................. 106/1.05
4,657,591 A * 4/1987 Shioi et al. ............... 106/31.57
6,083,311 A * 7/2000 Kanbayashi et al. ...... 106/31.65
6,120,590 A * 9/2000 Miyamoto et al. ......... 106/31.6
6,275,816 B1 * 8/2001 Hattori et al. ........... 106/14.11
6,422,776 B1 * 7/2002 Nakatani ..................... 401/209

FOREIGN PATENT DOCUMENTS

| JP | 63-54475 | 3/1988 |
| JP | 63-72771 | 4/1988 |
| JP | 8-199108 | 8/1996 |

* cited by examiner

Primary Examiner—Mark L. Bell
Assistant Examiner—Veronica F. Faison
(74) Attorney, Agent, or Firm—Howard C. Miskin, Esq.; Gloria Tsui-Yip, Esq.

(57) ABSTRACT

An aqueous metallic ink composition comprising an aluminum powder pigment, a colorant, a polysaccharide, water, a water-soluble solvent and a material selected from a polyvinyl pyrrolidone, a polyethylene oxide or a compound thereof.

30 Claims, No Drawings

AQUEOUS METALLIC INK COMPOSITION

BACKGROUND OF THE INVENTION

1. Field of the Invention

The present invention relates to an aqueous metallic ink composition which can be used for writing tools, particularly for ball-point pens, printing inks, fields pertaining to coatings, and the like, and in particular, which can be suitably used for double-color inks.

2. Description of the Prior Art

Heretofore, various types of aqueous metallic ink compositions have been proposed. For example, Japanese Unexamined Patent Publication No. 63-54475 discloses an aqueous aluminum flake pigment composition for aqueous coating materials comprising aluminum flakes, inorganic phosphoric acids, specific aliphatic compounds, water, water-soluble alcohol, and hydrocarbon oil. Japanese Unexamined Patent Publication No. 63-72771 discloses an aqueous metallic ink composition for writing instruments comprising aluminum paste, a paste, and water-processed pigments, wherein the said paste contains, (a) acrylic emulsion and (b) at least one species of resins selected from polyvinyl alcohols and water-soluble cellulosic resins compounded at a specific proportion. The official gazette of the Japanese Unexamined Patent Publication No. 8-199108 discloses an aqueous pigment ink for ball-point pens containing metallic powder pigments, film-forming resins of the handwritings, viscosity modifying resins, specific compounds, water-soluble organic solvents, and water.

However, in the case of these aluminum powder pigments whose surfaces are usually treated by stearic acids and inorganic phosphoric acids upon making finely-divided particles by grinding and abrasion, colorants are hard to be fixed on the particle surface of aluminum powder pigments, and the colorants are dispersed in the ink compositions, separating from the aluminum powder pigments and thereby generating a difficult problem in developing colors with metallic tones having hues of various types of coloring pigments with colors. Particularly, in the case of a so-called double-color aqueous metallic ink composition generating an outline (an outer contour line) with dyes permeating and dispersing around a center handwriting (center color) formed by aluminum powder pigments when writing on a surface of a sheet of paper, and the like, since the said ink composition comprises dyes, water, and water-soluble organic solvents as well as aluminum powder pigments, it is difficult for the center handwriting (center color) of aluminum powder pigments to develop colors with metallic tones having various types of hues of aluminum powder pigments. Moreover, the coated films using conventional metallic ink compositions have a problem of having lower bonding to non-absorbent surfaces.

SUMMARY OF THE INVENTION

Therefore, it is an object of the present invention to provide for the effective fixing of colorants on the particle surface of aluminum powder pigments and to reduce or eliminate the dispersal into the remainder of the ink composition of colorants intended for the coloring of aluminum powder pigments or their separation from said aluminum powder pigments.

It is a further object of the present invention to provide for the development of colors with metallic tones having hues of various types of coloring pigments with colors.

Further, it is an object of the present invention to provide a double-color aqueous metallic ink composition that generates an outline (an outer contour line) with dyes that permeate and disperse around a center handwriting (central color) formed by aluminum powder pigments when writing on a surface of a sheet of paper; or the like, in which the center handwriting (center color) of aluminum powder pigments develops colors with metallic tones, thereby providing various types of hues to aluminum powder pigments.

It is also an object of the present invention to provide a metallic ink composition that forms coated films with improved bonding to non-absorbent surfaces.

These and the other objects are desirably provided, in accordance with the present invention, by an aqueous metallic ink composition comprising:

a. an aluminum powder pigment,
    b. a colorant,
    c. a polysaccharide,
    d. water,
    e. a water-soluble solvent, and
    f. a material selected from
        i. a polyvinyl pyrrolidone,
        ii. a polyethylene oxide, or
        iii. a compound thereof.

or, alternatively, by a double color aqueous metallic ink composition comprising a. an aluminum powder pigment,
    b. a polysaccharide,
    c. water,
    d. a water-soluble organic pigment,
    e. a water-soluble organic solvent selected from:
        i. an alcohol,
        ii. a glycol, or
        iii. a glycol ether having a branched hydrophobic group, f. a water-soluble dye,
    g. a material selected from
        i. a polyvinyl pyrrolidone,
        ii. a polyethylene oxide, or
        iv. a compound thereof

BRIEF DESCRIPTION OF THE PREFERRED EMBODIMENTS

As a result of intensive studies, it has been found that in compositions containing an aluminum powder pigment, a colorant, a polysaccharide, water, and a water-soluble organic solvent material that further contain a polyvinyl pyrrolidone or a polyethylene oxide or a compound thereof, the polyvinyl pyrrolidone or polyethylene oxide or compound thereof appears to act as a binder that fixes colorants on the aluminum powder pigment and can provide aqueous metallic ink compositions containing aluminum powder pigments with the colorants fixed on the surface of the aluminum powder pigments by the polyvinyl pyrrolidone or polyethylene oxide or compound thereof. And it has been found that handwritings can be obtained with ink compositions in accordance with the present invention that are capable of developing colors with metallic luster having the hues of various types of colorants by aluminum powder pigments with the colorants fixed on the surfaces of the aluminum powder pigments when writing on a sheet of paper using this ink composition in accordance with the present invention.

In accordance with the present invention, there is provided an aqueous metallic ink composition comprising:

a. an aluminum powder pigment,
b. a colorant,
c. a polysaccharide,
d. water
e. a water-soluble solvent and
f. a material selected from
   i. a polyvinyl pyrrolidone,
   ii. a polyethylene oxide, or
   iii. a compound thereof,
(the polyvinyl pyrrolidone, polyethylene oxide or compound thereof acting as a binder to fix colorants on the said aluminum powder pigments.)

In addition, in the case of using compounds of any one of polyvinyl pyrrolidone or polyethylene oxide as a preferred embodiment of the invention, it has been found that the coated films produced by ink compositions in accordance with the present invention can obtain excellent bonding to non-absorbent surfaces.

Moreover, in particular, in accordance with the present invention, there is provided a double color (or dual color) aqueous metallic ink composition comprising a double color aqueous metallic ink composition comprising
a. an aluminum powder pigment,
b. a polysaccharide,
c. water,
d. a water-soluble organic pigment,
e. a water-soluble organic solvent selected from
   i. an alcohol,
   ii. a glycol, or
   iii. a glycol ether
having a branched hydrophobic group
f. a water-soluble dye,
g. a material selected from
   i. a polyvinyl pyrrolidone,
   ii. a polyethylene oxide, or
   iii. a compound thereof
(the polyvinyl pyrrolidone, polyethylene oxide or compound thereof acting as a binder that fixes the said coloring pigments on the said aluminum powder pigment.)

The reasons why polyvinyl pyrrolidone or polyethylene oxide easily fixes colorants including colored pigments and the like on the surface of aluminum powder pigments are considered as follows. The concepts mentioned here, however, do not necessarily limit this invention. For example, it is assumed that the pyrrolidone group suspended at the a position of the vinyl group (in the case of polyvinyl pyrrolidone) or the oxygen comprising the ether linkage (in the case of polyethylene oxide) is capable of absorbing colorants as well as acting on the surface of aluminum powder pigments, respectively. Therefore, even though aluminum powder pigments are subjected to a surface treatment, it can be assumed that the colorants of ink compositions of the present invention can form coated films of colored pigments (colorants) with metallic luster by fixing colorants on the aluminum powder pigments. Therefore, in the present invention, either polyvinyl pyrrolidone or polyethylene oxide or compounds thereof can be compounded. In addition, since the pyrrolidone group suspended at the a position of the vinyl group (in the case of polyvinyl pyrrolidone) or the oxygen composing the ether linkage (in the case of polyethylene oxide) forms hydrogen bonding to coated materials, such as non-absorbent surfaces respectively, the bonding of the coated films to the coated materials, being improved.

Further, as a preferred embodiment of the present invention, in the case of the double-color aqueous metallic ink compositions, comprising a double color aqueous metallic ink composition comprising
a. an aluminum powder pigment,
b. a polysaccharide,
c. water,
d. a water-soluble organic pigment,
e. a water-soluble organic solvent selected from
   i. an alcohol,
   ii. a glycol, or
   iii. a glycol ether
having a branched hydrophobic group
f. a water-soluble dye,
h. a material selected from
   i. a polyvinyl pyrrolidone,
   ii. a polyethylene oxide, or
   iii. a compound thereof,
when coated on a paper surface, the center handwriting (central color) of aluminum powder pigments with coloring pigments fixed on the surface develops colors clearly with a metallic luster having hues of various types of coloring pigments as the dyes permeate and disperse around the center color, forming an outline (an outer line) on the paper surface. The dyes develop clear colors since the dyes permeate and disperse around the said center handwriting (central color) as the outline of the dyes.

In a word, according to the double-color aqueous metallic ink composition of the present invention, since the coloring pigments are fixed on the aluminum powder pigments, the ink composition can prevent these coloring pigments from dispersing to the outline of the dyes, thereby enabling
a. the centerline with metallic luster to develop colors with metallic luster depending on the hue of each type of coloring pigment and
b. the outline to develop colors clearly.

The ink composition of the present invention desirably provides aqueous metallic ink compositions which can provide color development having a metallic luster with hues of each type of colorants.

Ink compositions of the present invention also desirably provide double-color aqueous metallic ink compositions which enable the center handwriting (central color) of aluminum powder pigments to develop colors clearly ,while developing colors of the outline (outer contour line) as dyes permeate and disperse around the said center handwriting (central color).

Further, ink compositions of the present invention desirably provide aqueous metallic ink compositions which can develop colors with metallic luster having each type of colorants while improving the bonding of a coated film to a non-absorbent surface.

Polyvinyl Pyrrolidone.

Polyvinyl pyrrolidone used in the present invention is not specifically limited, but in order to fix colorants on aluminum powder pigments, polyvinyl pyrrolidone which has a number average molecular weight of 3,000 to 3,000,000 is preferable from a practical viewpoint. Above all, polyvinyl pyrrolidone which has a number average molecular weight of 6,000 to 1,500,000 is particularly preferable. For example, ones available from ISP Japan Co., Ltd. under the trade names of "PVP K-15" (Number average molecular weight: 6,000 to 15,000) and "PVP K-30" (Number average molecular weight: 40,000 to 80,000) can be mentioned.

The content of polyvinyl pyrrolidone is not specifically limited, but in order to fix the colorants on the aluminum powder pigments and in order for the aluminum powder pigment having the hue of colored colorants to develop color with metallic luster, the content of polyvinyl pyrrolidone is preferably 0.1–40% by weight with respect to the total amount of the ink composition from a practical viewpoint. When the content of polyvinyl pyrrolidone is less than 0.1% by weight with respect to the total amount of the ink composition, the fixability of the colorants on the aluminum powder pigments lowers. On the other hand, when the content of polyvinyl pyrrolidone is greater than 40% by weight, flocculation occurs among aluminum powder pigments as well as affecting the viscosity and fluidity of the ink composition. The increased viscosity or decreased fluidity deteriorates the writing performance. The optimum content of polyvinyl pyrrolidone compounded ranges 1–20% by weight.

Polyethylene Oxide.

Polyethylene oxide used in the present invention is not specifically limited, but in order to fix colorants on aluminum powder pigments, polyethylene oxide which has a number average molecular weight of 100,000 to 5,000,000 is preferable from a practical viewpoint. Above all, polyethylene oxide which has a number average molecular weight of 100,000 to 2,500,000 is particularly preferable. For example, ones available from Sumitomo Seika Chemicals Company, Limited. under the trade names of "PEO-1" (Number average molecular weight: 150,000 to 400,000) and "PEO-3" (Number average molecular weight: 600,000 to 1,100,000) and the like can be used.

The content of polyethylene oxide is not specifically limited, but in order to fix the colorants on the aluminum powder pigments and in order for the aluminum powder having the hue of colored colorants pigment to develop color with metallic luster, the content of polyethylene oxide is preferably 0.1–10% by weight with respect to the total amount of the ink composition from a practical viewpoint. When the content of polyethylene oxide is less than 0.1% by weight with respect to the total amount of the ink composition, the fixability of the colorants on the aluminum powder pigments lowers. On the other hand, when the content of polyethylene oxide is greater than 10% by weight, flocculation occurs among aluminum powder pigments as well as affecting the viscosity and fluidity of the ink composition. The increased viscosity or decreased fluidity deteriorates the writing performance. The optimum content of polyethylene oxide compounded ranges 0.5–5% by weight.

Aluminum Powder Pigments.

Aluminum powder pigments can either be subjected to a surface treatment or not. In the present invention, even though aluminum powder pigments used may not be subjected to a surface treatment, the fixability of colorants to aluminum powder pigments is high. For information, in the surface treatment of aluminum powder pigments, aliphatic acids or the derivatives thereof are used. These aliphatic acids can be saturated or unsaturated. As saturated aliphatic acids, stearic acids and the like can be cited. As unsaturated aliphatic acids, oleic acid and the like can be cited. And as the derivatives of aliphatic acids, aliphatic acid salts and the like are included. As for aluminum powder pigments, those having metallic luster can be used, and those with high dispersibility with water are preferable. Also aluminum powder pigments can be leafing types or non-leafing types.

Examples of aluminum powder pigments include "Alpaste WJP-U75C" (available from by Toyo Aluminum Co., Ltd.), "Alpaste WE 1200" (available from Toyo Aluminum Co., Ltd.), "Alpaste WXM-7675" (manufactured by Toyo Aluminum Co., Ltd.), "Alpaste WXM-0630" (available from Toyo Aluminum Co., Ltd.), "1110 W" (available from Showa Aluminum Corporation), "2172 SW" (available from Showa Aluminum Corporation), "AW808 C" (available from Asahi Chemical Industry Co., Ltd.), and the like. The average particle diameter of aluminum powder pigments is not specifically limited, but, the ones whose average particle diameter ranges 5–15 $\mu$m are excellent in writing performance and printing aptitude.

Aluminum powder pigments can be used either alone or in combinations of two or more of them. The content of the aluminum powder pigments is , for example, 3–30% (preferably 4–15%) by weight with respect to the total amount of the ink composition. When the content of the aluminum powder pigments is less than 3% by weight with respect to the total amount of the ink composition, the metallic luster cannot be realized and coated films with metallic tone cannot be obtained. On the other hand, when the content of the aluminum powder pigments is greater than 30% by weight, the composition becomes too much in solids and that increases viscosity or decreases fluidity, deteriorating the writing performance and the like.

Colorant.

Colorants are not specifically limited, in so far as they are ones with high dispersibility with an aqueous ink. The colorants may also be water-soluble.

As colorants, examples include pigments (inorganic pigments, organic pigments, fluorescent pigments, and the like), dyes (including direct dyes, acid dyes, basic dyes, and the like). In addition, plastic pigments colored by pigments or dyes can be used.

As coloring pigments bringing about the hues to the center handwriting (central color) of aluminum powder pigments, inorganic pigments are particularly preferable. Examples of colorants include inorganic pigments, such as carbon black, and organic pigments, such as copper phthalocyanine pigments, threne pigments, azo pigments, quinacridon pigments, anthraquinone pigments, dioxane pigments, indigo pigments, thioindigo pigments, perinone pigments, perylene pigments, indolenone pigments and azomethine pigments, and the like. Further, as colorants, pigment dispersions dispersed by surfactants can be used. The present invention can use one species of coloring pigments or can use combinations of two or more of them.

The content of the coloring pigments is, for example, 0.05–15% by weight, and preferably 1–10% by weight, with respect to the total amount of the ink composition. When the coloring pigment is less than 0.05% by weight with respect to the total amount of the ink composition, the concentration of the coloring pigments becomes low and it is difficult to develop colors of aluminum powder pigments depending on the hue of the coloring pigments with metallic luster even though the coloring pigments are fixed on the aluminum powder pigments by polyvinyl pyrrolidone or polyethylene oxide. On the other hand, when the colorant exceeds 15% by weight, it becomes so much in solids that the viscosity and the fluidity are adversely affected. Due to the increase of the viscosity and the decrease in the fluidity, the writing performance and the like deteriorate.

In the case of double-color aqueous metallic ink compositions, it causes no problems in so far as they are the ones comprising the component comprising center handwriting and the component comprising outlines around the said center handwriting, further comprising the aluminum powder pigment particles with coloring pigments combined on the surface . However, in the case of the double-color aqueous ink composition, the dyes are preferable in order to generate outlines (contour lines) as the dye permeates and disperses around the center handwriting (center color) formed by aluminum powder pigments.

In addition, such dyes are the most suitable as to show outlines (contour lines) clearly without preventing the fixation of the coloring pigments fixed on aluminum powder pigments. In this regard, it is confirmed that at least one species of water soluble dyes among anthraquinone dyes, carbonium dyes and metal complex dyes can satisfy the above-mentioned requirements and in the case of the double-color aqueous ink compositions of the present invention requires the use of the said water-soluble dyes as essential.

Particularly, at least one species of water-soluble dyes selected from diphenyl methane dyes, triphenyl methane dyes, xanthane dyes, acridine dyes, 1:1metal complex dyes, and copper phthalocyanine dyes is preferable.

Usable anthraquinone dyes are those having an anthraquinone structure, and include antraquinone derivatives and anthrone derivatives. For example, C.I. Acid Blue 27, C.I. Acid Blue 43 C.I. Acid Green 25, C.I. Basic Violet 25, C.I. Basic Blue 60, C.I. Mordant Red 11, C.I. Acid Red 83, C.I. Direct Green 28 and C.I. Mordant Blue 48 are usable.

The carbonium dyes are not particularly limited and may be any of those based on a carbonium ion. Diphenyl methane dyes, triphenyl methane dyes, xanthane dyes and acridine dyes are preferable for use in the present invention. Examples of diphenyl methane dyes include C.I. Basic Yellow 2, C.I. Basic Yellow 3 and C.I. Basic Yellow 37. Examples of triphenyl methane dyes include C.I. Acid Blue 90, C.I. Acid Green 16, C.I. Acid Green 49, C.I. Basic Red 9, C.I. Basic Blue 7, C.I. Acid Violet 1, C.I. Direct Blue 41, C.I. Mordant Blue 1,and C.I. Mordant Violet 1. Examples of xanthane dyes include C.I. Acid Yellow 74, C.I. Acid Red 52, C.I. Acid Violet 30, C.I. Basic Red 1, C.I. Basic Violet 10, C.I. Mordant Red 27 and C.I. Mordant Violet 25. Examples of acridine dyes include C.I. Basic Yellow 6, C.I. Basic Yellow 7, C.I. Basic Orange 14, and C.I. Basic Orange 15.

The metal complex dyes include the dyes containing metals and the dyes which can be bonded with a metal by a coordination bond, as well as metal complex dyes. The usable dyes which can be bonded with a metal by a coordination bond, for example, are azo dyes having an OH group, COOH group, $NH_2$ group, etc. Examples of such azo dyes include C.I. Mordant Red 30, C.I. Mordant Yellow 3, C.I. Mordant Green 15 and C.I. Mordant Blue 13.

Among these metal complex dyes, copper phthalocyanine dyes, 1:1 metal complex dyes, 1:2 metal complex dyes are suitably used. More specifically, examples of the copper phthalocyanine dyes include C.I. Direct Blue 86. Examples of 1:1 metal complex dyes include C.I. Acid Yellow 54, C.I. Acid Orange 74, C.I. Acid Red 186 and C.I. Acid Violet 56. Examples of 1:2 metal complex dyes include C.I. Acid Yellow 59, C.I. Acid Black 60, C.I. Acid Red 296 and C.I. Direct Blue 167.

For example, dyes such as AIZEN EOSIN GH. CONC (available from Hodogaya Chemical Co., Ltd, C.I. Acid Red 87) can be used.

The content of the water-soluble dyes can be suitably selected depending on the types or the like of water-soluble dyes to be used.

Usually, the content is about 0.1–10% by weight, preferably 1–5% by weight with respect to the total amount of the ink composition. When the content of the water-soluble dye is higher than 10% by weight, the viscosity and fluidity of the ink may be adversely affected. When the content is lower than 0.1% by weight, the desired double-color effect on the handwritings may not be produced.

Polysaccharides.

As polysaccharides, they are not specifically limited in so far as they can modify the viscosity of the ink composition, preferably giving pseudo-plasticity fluidity or thixotropic properties and can disperse aluminum powder pigments. Applicable as polysaccharides include microbial polysaccharides and the derivatives thereof, water-soluble polysaccharides derived from plants and derivatives thereof, water-soluble polysaccharides derived from animals and derivatives thereof, and the like. Water-soluble polysaccharides derived from microbes and derivatives thereof include pullulan, xanthan gum, wellan gum, succinoglucan, dextran and the like. Water-soluble polysaccharides derived from plants and derivatives thereof include tragacanth gum, guar gum, tara gum, locust bean gum, ghatti gum, arabinogalactan gum, gum arabic, quince seed gum, pectin, starch, psyllium seed gum, carrageenan, alginic acid , agar and the like. Water-soluble polysaccharides derived from animals and derivatives thereof include gelatin, casein and the like.

As preferable polysaccharides, microbial polysaccharides and derivatives thereof, including particularly xanthan gum, wellan gum, rhamsan gum, and succinoglucan can be mentioned. Polysaccharides can be used either alone or in combinations of two or more of them.

The content of polysaccharides is, for example, 0.01–4% by weight, and preferably 0.3–2% by weight with respect to the total amount of the ink composition. When the content of the polysaccharides is less than 0.01% by weight with respect to the total amount of the ink composition, the dispersibility of aluminum powder pigments lowers and they are likely to precipitate. When the content of the polysaccharides exceeds 4% by weight, the viscosity of the ink becomes high and the writing performance and printing aptitude deteriorate.

Water.

The aqueous metallic ink composition of the present invention contains water. As water, conventionally used one (such as ion-exchange water, distilled water, and the like) is used. The content of water is not specifically limited and can be selected depending on the types or the amount of other components (aluminum powder pigments, colorants, polysaccharides, polyvinyl pyrrolidone, polyethylene oxide, water-soluble organic solvents, and the like) or the targeted viscosity of the ink composition. The content of water can be selected from a wide range , for example, 1–80% by weight with respect to the total ink composition. However, the water is preferably contained in about 20–70% by weight.

Water-soluble Organic Solvent.

In the aqueous metallic ink composition of the present invention, water-soluble organic solvents can be used. Water-soluble organic solvents are not limited in so far as it can mix with water and can prevent the dryness of the ink or the freezing of the ink at a low temperature. For this reason, water-soluble organic solvents also have the function as wetting agents. As examples of the water-soluble organic solvents, glycols (including ethylene glycol, diethylene glycol, propylene glycol, and the like), glycol ethers (including ethylene glycol monomethyl ether and the like), carbithols (including diethylene glycol monomethyl ether), glycerin, trimethylol propane and the like other than alcohols can preferably be used. Water-soluble organic solvents can be used alone or in combinations of two or more of them.

In the double color aqueous metallic ink composition, too, water soluble organic solvents are not specifically limited. It causes no problem in so far as the double-color aqueous metallic ink composition is the one containing the components comprising the center handwriting and the components comprising the outline around the said center handwriting, wherein the aluminum powder pigments to which coloring pigments are bonded are contained as a component comprising the said center handwriting portion.

However, in the case of the double-color aqueous metallic ink composition, it is the most suitable to use at least one species of water-soluble organic solvents among alcohols, glycols and glycol ethers having a branched hydrophobic group.

In the water-soluble organic solvent of the present invention, "having a branched hydrophobic group" means the structure having a hydrophobic group as a side chain attached to a main chain in a chain-like compound. The type of the hydrophobic group may be a methyl group or an ethyl group. One molecule of the compound may have one or more hydrophobic groups. When two or more of the hydrophobic groups are present, they may be the same type or different types from each other. In the case of hexylene glycol, for example, the structure having a methyl group corresponds to the structure "having a branched hydrophobic group".

Among the above water-soluble organic solvents, alcohols having a branched hydrophobic group are the compounds represented by the formula $C_nH_{2n+2}O$ (n: an integer of 4 to 6) such as isobutanol, s-butanol, t-butanol, isopentanol, s-pentanol, t-pentanol, 3-pentanol, 3-methyl-2butanol, 2-methyl-1butanol($C_5$), 2-ethylbutanol, 4-methyl-2-pentanol($C_6$), etc.

Examples of glycols and glycol ethers having a branched hydrophobic group include 1,3-octylene glycol; hexylene glycol, dipropylene glycol, tripropylene glycol, polypropylene glycol, poly(oxyethylene-oxypropylene) derivatives, ethylene glycol monoisopropyl ether, propylene glycol monobutyl ether, propylene glycol monoethyl ether, dipropylene glycol monobutyl ether, dipropylene glycol monopropylether, dipropylene glycol monoethyl ether and dipropylene glycol monomethyl ether.

Among these water-soluble organic solvents, dipropylene glycol monopropyl ether, dipropylene glycol monomethyl ether, hexylene glycol, etc. are preferably used.

The amount of these water-soluble-organic solvents is not specifically limited but may be, for example, 1–40% by weight, and preferably 5–20% by weight, with respect to the total amount of the ink composition. If the amount of the water-soluble organic solvents is less than 1% by weight, the ink compositions are likely to dry and when used as ink compositions for ball-point pens, sometimes clogging occurs and cannot coat.

In addition, in the case of double color ink containing at least one species of alcohols, glycols, and glycol ethers having a branched hydrophobic group, sometimes it does not permeate and disperse satisfactorily.

On the other hand, if the content exceeds 40% by weight, the ink is hard to dry after coating. Also, in the case of double-color ink containing at least one species of organic solvents among alcohols, glycols, and glycol ethers having a branched hydrophobic group, the solubility of polysaccharides lowers and is likely to separate out.

The aqueous metallic ink composition of the present invention can add, as needed, conventional additives including rust-inhibitors such as benzotriazole, tolyltriazole, dicyclohexyl ammonium nitrate and the like, antiseptic mildew-proofing agents such as benzoisothiazoline-type, pentachlorophenol-type and cresol and the like, dispersing agents including water soluble acryl resin, water-soluble maleic acid resin, water soluble resin of water soluble styrene, acryl copolymer, water-soluble styrene maleic acid copolymer, surfactants, wetting agents, anti-foaming agents, leveling agents, anti-cohesion agents, pH regulators, pseudo-plasticity giving agents and the like.

Particularly, in the case of double-color ink compositions containing coloring pigments, dyes, water and water-soluble organic solvents as well as aluminum powder pigments, as for aluminum powder pigments, coloring pigments, dyes, water, and water-soluble organic solvents, already mentioned ones are to be used and, further, surfactants can be compounded.

As surfactants, polyoxyethylene alkyl ether, sorbitan alkyl ethers, alkyl amine, and the like can be used.

The viscosity of the aqueous metallic ink composition of the present invention is not specifically limited in so far as it is the one conventionally used, or in so far as aluminum powder pigments do not precipitate and the viscosity is suitable for writing performance and printing aptitude. Particularly, since the ink composition of the present invention compounds polysaccharides, the viscosity can be easily adjusted to a proper viscosity depending on the types and the applicable amount of polysaccharides whether the ink composition is a so-called gel-type ink composition or low-viscosity free liquid types. In the present invention, it is preferably used as a gel-type aqueous metallic ink composition. The viscosity range of the gel-type aqueous metallic ink composition is, for example, 1,000–10,000 mPa s, preferably 2,000–8,000 mPa s. These viscosities are measured values by an ELD-type viscometer (3° R14 corn; rotation speed: 0.5 rpm; 20° C.).

Method of preparation.

The aqueous metallic ink composition of the present invention can be obtained, for example, by adding compounds selected from at least either of polyvinyl pyrrolidone or polyethylene oxide to the dispersion of aluminum powder pigments dispersed in water and water-soluble organic solvent, and thereafter. charging colorant (coloring pigments) and mixing polysaccharides and, as needed, each type of additives. For information, the colorants can be used as colorant dispersions (pigment dispersions) dispersed by dispersing agents beforehand.

In the case of double-color ink compositions, The aqueous metallic ink composition of the present invention can be obtained, for example, by adding compounds selected from at least either of polyvinyl pyrrolidone or polyethylene oxide to the dispersion of aluminum powder pigments dispersed in water and water-soluble organic solvent, and thereafter charging at least one species of water-soluble dyes selected from anthraquinone dyes, carbonium dyes and metal complex dyes as well as coloring pigments and mixing polysaccharides and, as needed, each type of additives, and then adding at least one species of water-soluble organic solvents among alcohols, glycols, and glycol ethers having a branched hydrophobic group, thereby obtaining the double-color aqueous ink compositions comprising aluminum powder pigments with the coloring pigments fixed on the surface by polyvinyl pyrrolidone. For information, the colorants can be used as colorant dispersions (pigment dispersions) dispersed by dispersing agents beforehand.

As for these preparations, heretofore known dispersing techniques, degassing techniques, filtering techniques and the like can be adopted.

An aqueous metallic ink composition of the present invention can, not only develop colors as metallic luster having the hues of colored pigments, but also be excellent in bonding to non-absorbent surfaces.

Therefore, it can preferably be used for writing instruments, especially for aqueous ball-point pens and aqueous felt pens. Particularly, the aqueous ink composition of the present invention can adjust viscosity to an appropriate level for use in an aqueous ball-point pen. For information, the "absorbent surface" referred to in connection with the present invention refers to a surface which makes an aqueous metallic ink composition of the present invention absorb and permeate in it. For example, a sheet of paper not subjected to surface treatment can be mentioned. On the other hand, "non-absorbent surface" refers to a surface which does not make an aqueous metallic ink composition of this invention absorb and permeate into it. For example, metallic plates, including tinplates, and plastic plates, including polyethylene plates, can be mentioned.

EXAMPLES

Hereafter, the present invention is to be explained in detail based on the Examples and Comparative Examples. However, the present invention is not limited to these Examples.

Preparation of Colorants

As colorants, the below-mentioned pigment dispersion 1 prepared beforehand and the below-mentioned pigment dispersion 2 on sale were used. In the case of double-color metallic ink compositions, the following dyes were used as dyes shown in the Tables 1, 2 and 3.

Pigment dispersion 1.

Pigment dispersion (average particle size=0.08 $\mu$m; solid content=10% by weight) was prepared by the colorants (phthalocyanine blue) and the dispersing agent (styrene acryl copolymer) charged into ion-exchange water with the proportion of 5:1, with sodium hydroxide. Hereafter, these pigment dispersions are to be called pigment dispersion 1.

Pigment dispersion 2

As pigment dispersion 2, the tradename HOSTAFINE GREEN GN (manufactured by Clariant Japan Co., Ltd., C.I. No.74260) was used. The pigment dispersion 2 is a pigment dispersant of surfactant disperse type with the average particle size of 0.06 $\mu$m.

Dyes

As dyes, the tradename AIZEN EOSIN GH.CONC (manufactured by Hodogaya Chemical Co., Ltd, C.I. Acid RED 87) was used. In addition, as a raw material, the following aluminum powder pigments, polysaccharides, binders (bonding resin for coloring), water-soluble organic solvents, antiseptic mildew-proofing agents, and rust inhibitors were used.

Aluminum Powder Pigments.

Aluminum powder pigment 1: tradename "Alpaste WXM0630" (available from Toyo Aluminum Co., Ltd; leafing type; average particle size=about 8 $\mu$m)

Aluminum powder pigment 2: tradename "Alpaste WXM7675" (manufactured by Toyo Aluminum Co., Ltd; non-leafing type; average particle size=about 15 $\mu$m)

Polysaccharides.

Xanthan gum: trade name "Kelzan" (available from Sansho Co., Ltd)

Welan gum: tradename " K1A96" (available from by Sansho Co., Ltd)

Rhamsan gum: tradename " K7C233" (available from Sansho Co., Ltd)

Bonding Resin for Coloring.

Polyvinyl pyrrolidone 1: tradename "PVP K-15" (available from ISP Japan, number average molecular weight: 6,000–15,000)

Polyvinyl pyrrolidone 2: tradename "PVP K-30" (available from ISP Japan, number average molecular weight: 40,000–80,000)

Polyethylene oxide 1: tradename "PEO -1" (available from Sumitomo Seika Chemicals Company, Limited, number average molecular weight: 150,000–400,000)

Polyethylene oxide 2: tradename "PEO -3" (available from Sumitomo Seika Chemicals Company, Limited, number average molecular weight: 600,000–1,100,000)

Polyvinyl alcohol: tradename "PVA-117" (manufactured by KURARAY CO., LTD, average molecular weight= about 1,800) Polyacrylic soda: tradename "JULIMER AC 20N " (available from NIHON JUNYAKU CO., LTD)

Styrene-acryl resin emulsion: tradename "JOHNCRYL 1535" (available from Johnson Polymer Co., Ltd)

Acrylic-vinyl acetate resin emulsion: tradename "Mowinyl SK-3" (available from Hoechst Synthesis Co., Ltd)

Water-soluble Organic Solvent

Glycerin

Propylene glycol

Antiseptic Mildew-proofing Agent 1,2-Benzoisothiazolin 3-one: tradename Proxell GXL (available from Hoechst Synthesis Co., Ltd)

Rust-inhibitor

Benzotriazole

Examples 1–10

In each Example, the ink composition was prepared compounding the component with the proportion shown in the Tables 1 and 2. (The amount of each component in the Tables to be compounded is represented by % by weight with respect to the total amount of the ink composition).

To be concrete, in each Example, metallic pigment dispersion was prepared by dispersing aluminum powder pigments after stirring for 1 hour at room temperature with the mixture of ion-exchange water and water-soluble organic solvents, thereafter charging a binder (a bonding resin for coloring), and making aluminum powder pigments absorb a bonding resin for coloring.

To this dispersion, pigment dispersions or dispersions and dyes were added, thereby the mixture was stirred for 1 hour at room temperature (20–25° C.) and the coloring pigments were fixed on aluminum powder pigments. Further, polysaccharides and each type of additives were charged, thereafter stirred for 1 hour at room temperature (20–25° C.) and the ink composition was obtained.

For information, the Examples 9 and 10 are double-color aqueous metallic ink composition. This double-color aqueous metallic ink composition was prepared in the same manner as above except further charging at least one species of the compounds selected from the group among dipropylene glycol monopropyl ether, dipropylene glycol monomethyl ether and hexylene glycol in the last stage after charging the said polysaccharides and each additive.

Comparative Examples 1–7

Ink compositions of each Comparative Example were prepared in the same manner as Examples with the proportion of the components. (The amount of the component in the Table to be compounded is represented by % by weight with respect to the total amount of the ink composition)

shown in the Table 3. For information, Comparative Examples 6 and 7 are double-color aqueous metallic ink compositions.

TABLE 1

(% by weight)

| | Examples | | | | |
|---|---|---|---|---|---|
| | 1 | 2 | 3 | 4 | 5 |
| Aluminum powder pigments | | | | | |
| Aluminum powder pigment: 1 | 5.00 | | 5.00 | | 5.00 |
| Aluminum powder pigment: 2 | | 7.00 | | 7.00 | |
| Pigment dispersions | | | | | |
| Pigment dispersion: 1 | 40.00 | | 40.00 | | 40.00 |
| Pigment dispersion: 2 | | 10.00 | | 10.00 | |
| Polysaccharides | | | | | |
| Xanthan gum | 0.40 | | | | 0.40 |
| Wellan gum | | 0.30 | 0.30 | | |
| Rhamsan gum | | | | 0.30 | |
| Bonding resins for coloring | | | | | |
| Polyvinyl pyrrolidone 1 | 1.50 | 1.50 | | | |
| Polyvinyl pyrrolidone 2 | | | 1.00 | 1.00 | |
| Polyethylene oxide 1 | | | | | 1.00 |
| Polyethylene oxide 2 | | | | | |
| Polyvinyl alcohol | | | | | |
| Polyacrylic soda | | | | | |
| Styrene-acryl resin emulsion | | | | | |
| Acrylic vinylacetate resin emulsion | | | | | |
| Glycerine | 2.50 | 2.50 | 2.50 | 2.50 | 2.50 |
| Propylene glycol | 1.50 | 1.50 | 1.50 | 1.50 | 1.50 |
| 1,2-Benzoisothiazolin-3 one | 0.10 | 0.10 | 0.10 | 0.10 | 0.10 |
| Benzotriazole | 0.08 | 0.08 | 0.08 | 0.08 | 0.08 |
| Water | 48.92 | 77.02 | 49.52 | 77.52 | 49.42 |
| Color development | ○ | ○ | ○ | ○ | ○ |
| Bonding | ○ | ○ | ○ | ○ | ○ |

TABLE 2

(% by weight)

| | Examples | | | | |
|---|---|---|---|---|---|
| | 6 | 7 | 8 | 9 | 10 |
| Aluminum powder pigments | | | | | |
| Aluminum powder pigment 1 | | 5.00 | | 7.00 | 7.00 |
| Aluminum powder pigment 2 | 7.00 | | 7.00 | | |
| Pigment dispersions | | | | | |
| Pigment dispersion 1 | | 40.00 | | | |
| Pigment dispersion 2 | 10.00 | | 10.0 | 10.00 | 10.00 |
| Dyes | | | | 2.00 | 2.00 |
| Polysaccharides | | | | | |
| Xanthan gum | | | | | |
| Wellan gum | 0.30 | 0.30 | | | 0.20 |
| Rhamsan gum | | | 0.30 | 0.20 | |
| Bonding resins for coloring | | | | | |
| Polyvinyl pyrrolidone 1 | | | | 1.50 | |
| Polyvinyl pyrrolidone 2 | | | | | |
| Polyethylene oxide 1 | 1.00 | | | | 1.00 |
| Polyethylene oxide 2 | | 0.80 | 0.80 | | |
| Polyvinyl alcohol | | | | | |
| Polyacrylic soda | | | | | |
| Styrene-acryl resin emulsion | | | | | |
| Acrylic vinyl acetate resin emulsion | | | | | |
| Glycerine | 2.50 | 2.50 | 2.50 | 2.50 | 2.50 |
| Propylene glycol | 1.50 | 1.50 | 1.50 | | |
| Dipropylene glycol monopropyl ether | | | | 7.00 | 7.00 |
| Dipropylene glycol monomethyl ether | | | | 14.00 | |
| Hexylene glycol | | | | | 14.00 |
| 1,2-Benzoisothiazolin-3 one | 0.10 | 0.10 | 0.10 | 0.10 | 0.10 |
| Benzotriazole | 0.08 | 0.08 | 0.08 | 0.08 | 0.08 |
| Water | 77.52 | 49.72 | 77.72 | 55.62 | 56.12 |
| Color development | ○ | ○ | ○ | ○ | ○ |
| Bonding | ○ | ○ | ○ | ○ | ○ |

TABLE 3

(% by weight)

| | Comparative Examples | | | | | | |
|---|---|---|---|---|---|---|---|
| | 1 | 2 | 3 | 4 | 5 | 6 | 7 |
| Aluminum powder pigments | | | | | | | |
| Aluminum powder pigment 1 | 5.00 | 5.00 | | 5.00 | | 7.00 | 7.00 |
| Aluminum powder pigment 2 | | | 7.00 | | 7.00 | | |
| Pigment dispersions | | | | | | | |
| Pigment dispersion 1 | 40.00 | 40.00 | | 40.0 | | | |
| Pigment dispersion 2 | | | 10.00 | | 10.0 | 10.00 | 10.00 |
| Dyes | | | | | | 2.00 | 2.00 |
| Polysaccharides | | | | | | | |
| Xanthan gum | 0.40 | 0.40 | | | | | |
| Wellan gum | | | 0.30 | 0.30 | | | 0.20 |
| Rhamsan gum | | | | | 0.30 | 0.20 | |
| Bonding resins for coloring | | | | | | | |
| Polyvinyl pyrrolidone 1 | | | | | | | |
| Polyvinyl pyrrolidone 2 | | | | | | | |
| Polyethylene oxide 1 | | | | | | | |
| Polyethylene oxide 2 | | | | | | | |
| Polyvinyl alcohol | | 1.50 | | | | | |
| Polyacrylic soda | | | 1.50 | | | | |
| Styrene-acryl resin emulsion | | | | 30.0 | | | |
| Acrylic vinyl acetate emulsion | | | | | 30.0 | | |
| Glycerine | 2.50 | 2.50 | 2.50 | 2.50 | 2.50 | 2.50 | 2.50 |
| Propylene glycol | 1.50 | 1.50 | 1.50 | 1.50 | 1.50 | | |
| Dipropylene glycol monopropyl ether | | | | | | 7.00 | 7.00 |
| Dipropylene glycol monomethyl ether | | | | | | 14.00 | |
| Hexylene glycol | | | | | | | 14.00 |
| 1,2-Benzoisothiazolin-3 one | 0.10 | 0.10 | 0.10 | 0.10 | 0.10 | 0.10 | 0.10 |
| Benzotriazole | 0.08 | 0.08 | 0.08 | 0.08 | 0.08 | 0.08 | 0.08 |
| Water | 50.42 | 48.92 | 77.02 | 20.52 | 48.52 | 57.12 | 57.12 |
| Color development | X | X | X | X | X | X | X |
| Bonding | X | Δ | Δ | Δ | Δ | X | X |

Evaluation of the Ink Composition

Evaluation Test of Color Development

The aqueous metallic ink composition obtained by the Examples 1–10 and the Comparative Examples 1–7 was filled in the ink container for ball-point pens comprising a hollow barrel made of polypropylene with a nickel-silver ball-point pen tip (the material of the ball: carbide alloy) connected to one end. Any air bubble in the ink was removed by centrifuging, thereby the test sample of ball-point pens was obtained.

Using this test sample, writing on a black drawing paper and the hand writing was evaluated by visual observation based on the rating criteria as follows.

The results were shown in the color development part of the Tables 1 to 3 respectively.

Rating Criteria.
- ○ The color of the handwriting had the pigment color of colorants and metallic luster.
- x The color of the handwriting did not have the pigment color of colorants and had only the color of aluminum powder pigments.

Evaluation Test of Bonding.

The aqueous metallic ink composition obtained by the Examples 1–10 and the Comparative Examples 1–7 was filled in a writing instrument which uses felt cloth as a pen-tip (manufactured by Sakura Color Products Corporation: trade name "Sakura Sign Pen").

Using this pen, writing a straight line on a non-absorbent surface (tin plate, polyethylene plate) thereafter drying it for 30 minutes, thereby fretting the handwriting with a swab (500 g load).

By this fretting, the change in the handwriting was visually observed and was evaluated based on the following rating criteria.

The results were shown in the bonding part of the Tables 1 to 3 respectively.
- ○ No change could be seen in the handwriting at all.
- Δ Some scars could be seen in the handwriting.
- x The handwriting came away by fretting and the non-absorbent surface was exposed completely.

Results.

From the Tables 1–3, in the Examples 1, 3, 5 and 7, metallic luster having the blue hue, which is the color of the colored pigments was obtained and satisfactory bonding was also obtained after writing.

In the Examples 2, 4, 6 and 8, metallic luster having the green hue, which is the color of the colored pigments was obtained and satisfactory bonding was also obtained after writing.

In the Examples 9 and 10 as well, a handwriting of red outline around the center color with metallic tone having the clear hue of green appeared clearly and enough bonding after writing was obtained.

On the other hand, in the Comparative Examples 1–5, the handwriting with metallic tone having the hue of the colored pigments could not be obtained. Also, in the Comparative Example 1, no bonding could be obtained and in the Comparative Examples 2–5, satisfactory bonding could not be obtained, either. Also, in Comparative Examples 6 and 7, the red outline handwriting around the silver center color could be obtained but without metallic tone. In addition, the bonding after writing was not satisfactory.

Since this invention compounds polyvinyl pyrrolidone or polyethylene oxide, as a binder fixing the colorants on aluminum powder pigments and comprises aluminum powder pigments with the colored pigments fixed on the surface, the handwriting capable of developing colors with metallic tone having hues of each colorant can be obtained. Particularly, in the case of a double-color ink composition, since the colorants including colored pigments fix on the particle surface of aluminum powder pigments, outline with contour colors around the center colors with metallic tone having hues of colored pigments, a unique double-color ink composition can be prepared. In addition, this ink composition is excellent in bonding to non-absorbent surfaces.

The term "double color" could also refer to the appearance of different colors or different shades of the same color, e.g. blue and metallic blue or light blue or dark blue.

What is claimed is:

1. An aqueous metallic ink composition comprising:
   a. aluminum powder pigment particles,
   b. a colorant,
   c. a polysaccharide,
   d. water
   e. a water-soluble solvent and
   f. a material selected from the group consisting of
      i. a polyvinyl pyrrolidone,
      ii. a polyethylene oxide and
      iii. a mixture thereof,
   wherein said material fixes said colorant on the surface of said aluminum powder pigment particles.

2. An aqueous metallic ink composition as set forth in claim 1, wherein said polyvinyl pyrrolidone has a number average molecular weight of 3,000–3,000,000 and the viscosity of the ink is 1,000–10,000 mPa's (viscometer: ELD type viscometer, cone: 3°R14 cone, rotation speed: 0.5 rpm, temperature: 20° C.).

3. An aqueous metallic ink composition as set forth in claim 1, wherein said polyethylene oxide has a number average molecular weight of 100,000–5,000,000 and the viscosity of the ink is 1,000–10,000 mPa's (viscometer: ELD type viscometer, cone: 3°R14 cone, rotation speed: 0.5 rpm, temperature: 20° C.).

4. An aqueous metallic ink composition as set forth in claim 1, comprising aluminum powder pigment wherein the coloring pigments are fixed on the surface of aluminum powder pigments particles via polyvinyl pyrrolidone or polyethylene oxide or a mixture thereof.

5. A double color aqueous metallic ink composition comprising
   a. aluminum powder pigment,
   b. a polysaccharide,
   c. water,
   d. a water-soluble organic pigment,
   e. a water-soluble organic solvent selected from the group consisting of
      i. an alcohol,
      ii a glycol, or
      iii. a glycol ether
   having a branched hydrophobic group
   f. a water-soluble dye,
   g. a material selected from the group consisting of
      i. a polyvinyl pyrrolidone,
      ii. a polyethylene oxide, or
      iii. a mixture thereof
   wherin said material fixes said water-soluble organic pigment to said aluminum powder pigment.

6. An aqueous metallic ink composition as set forth in claim 5, wherein said water-soluble dye is a different color from said water-soluble organic pigment.

7. An aqueous metallic ink composition as set forth in claim 5, wherein
   said water-soluble dye is selected from
      i. coloring pigments,
      ii. anthraquinone dyes, iii. carbonium dyes, or iv. metal complex dyes.

8. An aqueous metallic ink composition as sent forth in claim 5, wherein the said water-soluble organic solvent is at least one species of compound selected from the group of dipropylene glycol monopropyl ether, dipropylene glycol monomethyl ether, and hexylene glycol.

9. An aqueous metallic ink composition as set forth in claim 5, wherein the water-soluble dye is at least one species of carbonium dyes and metal complex dyes.

10. An aqueous metallic ink composition as set forth in claim 9, wherein the water-soluble dye is at least one species of diphenylmethane dyes, triphenylmethane dyes, xanthan dyes, acridin dyes, 1:1 type metal complex dyes, and copper phthalocyanine dyes.

11. An aqueous metallic ink composition as set forth in claim 2, wherein the polyvinyl pyrrolidone is contained in 0.1–40% by weight with respect to the total amount of the ink composition.

12. An aqueous metallic ink composition as set forth in claim 3, wherein the polyethylene oxide is contained in 0.1–40% by weight with respect to the total amount of the ink composition.

13. An aqueous metallic ink composition as set forth in claim 6, wherein colored pigments are contained in 0.05–15% by weight, polysaccharides are contained in 0.01–4% by weight, water is contained in 1–80% by weight, at least one species of water-soluble organic solvents among alcohols, glycols and glycol ethers having a branched hydrophobic group is contained in 1–40% by weight, at least one species of water-soluble dyes among anthraquinone dyes, carbonium dyes, and metal complex dyes is contained in 0.1–10% by weight, polyvinyl pyrrolidone having a number average molecular weight of 3,000–3,000,000 is contained in 0.1–40% by weight, and aluminum powder pigment is contained in 3–30% by weight, with respect to the total amount of the ink composition, with the said aluminum powder pigment fixed on surface of the said colored pigments via the said polyvinyl pyrrolidone and the viscosity of the ink is 1,000–10,000 mPa s (viscometer: ELD type viscometer, corn: 3°R 14 corn, rotation speed: 0.5 rpm, temperature: 20° C.).

14. An aqueous metallic ink composition as set forth in claim 5, wherein colored pigments are contained in 0.05–15% by weight, polysaccharides are contained in 0.01–4% by weight, water is contained in 1–80% by weight, at least one species of water-soluble organic solvents among alcohols, glycols and glycol ethers having a branched hydrophobic group is contained in 1–40% by weight, at least one species of water-soluble dyes among anthraquinone dyes, carbonium dyes and metal complex dyes is contained in 0.1–10% by weight, polyethylene oxide having a number average molecular weight of 100,000–5,000,000 is contained in 0.1–10% by weight, and aluminum powder pigments are contained in 3–30% by weight, with respect to the total amount of the ink composition, with the said aluminum powder pigment fixed on the surface of the said colored pigments via the said polyvinyl pyrrolidone and the viscosity of the ink is 1,000–10,000 mPa s (viscometer: ELD type viscometer, corn: 3°R 14 corn, rotation speed: 0.5 rpm, temperature: 20° C.

15. double-color aqueous metallic ink composition comprising a component of a central writing portion and a component of an outline writing portion around the said central writing, wherein aluminum powder pigment particles are contained with colored pigments bonded with polyvinyl pyrrolidone, polyethylene oxide or compounds thereof on the surface of said aluminum powder pigment particles, as the components of the said central writing portion.

16. A double-color aqueous metallic ink composition as set forth in claim 15 wherein said central writing portion is a first color and said outline handwriting portion is a second color.

17. A written mark of a double-color aqueous metallic ink composition comprising a central handwriting portion containing aluminum powder pigment particles with coloring pigments bonded with polyvinyl pyrrolidone, polyethylene oxide or compounds thereof on the surface of said aluminum pigment particles and an outline handwriting portion with coloring dyes contained around the said central handwriting portion.

18. A double-color aqueous metallic ink composition as set forth in clam 17 wherein said central writing portion is a first color and said outline handwriting portion is a second color.

19. A method for preparing an aqueous metallic ink comprising a. Priding a dispersion of an aluminum powder pigment in water and a water-soluble organic solvent, b. adding a material selected from the group consisting of
  i. a polyvinyl pyrrolidone,
  ii. a polyethylene oxide, or
  iii. a mixture thereof to said dispersion, c. charging a colorant, and d. mixing a polysaccharide, wherein said material fixes said colorant to said aluminum powder pigment.

20. A method for preparing a double-color aqueous metallic-ink comprising a. Priding a dispersion of an aluminum powder pigment in water and a water-soluble solvent material, b. adding a material selected from the group consisting of
  i. a polyvinyl pyrrolidone
  ii. a polyethylene oxide, or
  iii. a mixture hereof to said dispersion, c. adding a water-soluble dye, d. mixing a polysaccharide, e. adding a water-soluble solvent selected from the group consisting of
  i. an alcohol
  ii. a glycol or
  iii. a glycol ether having a branched hydrophobic group, wherein said material fixes said colorant to said aluminum powder pigment.

21. An aqueous metallic ink composition comprising:

a. an aluminum powder pigment, b. a colorant, c. a polysaccharide, d. water e. a water-soluble solvent and f. a material selected from the group consisting of
  i. a polyvinyl pyrrolidone,
  ii. a polyethylene oxide and
  iii. a mixture thereof, wherein said material fixes said colorant to said aluminum powder pigment.

22. An aqueous metallic ink composition as set forth in claim 21, wherein said polyvinyl pyrrolidone has a number average molecular weight of 3,000–3,000,000 and the viscosity of the ink is 1,000–10,000 mPa's (viscometer: ELD type viscometer, cone: 3°R14 cone, rotation speed: 0.5 rpm, temperature: 20° C.).

23. An aqueous metallic ink composition as set forth in claim 21, wherein said polyethylene oxide has a number average molecular weight of 100,000–5,000,000 and the viscosity of the ink is 1,000–10,000 mPa's (viscometer: ELD type viscometer, cone: 3°R14 cone, rotation speed: 0.5 rpm, temperature: 20° C.).

24. An aqueous metallic ink composition as set forth in claim 21, comprising aluminum powder pigment wherein the coloring pigments are fixed on the surface of aluminum powder pigments particles via polyvinyl pyrrolidone or polyethylene oxide or a mixture thereof.

25. An aqueous metallic ink composition as set forth in claim 22, wherein the polyvinyl pyrrolidone is contained in 0.1–40% by weight with respect to the total amount of the ink composition.

26. An aqueous metallic ink composition as set forth in claim 23, wherein the polyethylene oxide is contained in 0.1–40% by weight with respect to the total amount of the ink composition.

27. An aqueous metallic ink composition comprising:
   a. an aluminum powder pigment,
   b. a colorant,
   c. a polysaccharide,
   d. water,
   e. a water-soluble solvent, and
   f. a material selected from the group consisting of
      i. a polyvinyl pyrrolidone,
      ii. a polyethylene oxide and
      iv. a mixture thereof, wherein said polyethylene oxide has a number average molecular weight of 100,000–5,000,000 and the viscosity of the ink is 1,000–10,000 mpa·s (viscometer: ELD type viscometer, cone 3°R14 cone, rotation speed: 0.5 rpm, temperature: 20° C.).

28. An aqueous metallic ink composition as set forth in claim 27, wherein the polyethylene oxide is contained in 0.1–40% by weight with respect to the total amount of the ink composition.

29. An aqueous metallic ink composition comprising:
   a. an aluminum powder pigment,
   b. a colorant,
   c. a polysaccharide,
   d. water,
   e. a water-soluble solvent, and
   f. a material selected from the group consisting of
      i. a polyvinyl pyrrolidone,
      ii. a polyethylene oxide and
      iii. a mixture thereof, wherein said material fixes said colorant to said aluminum powder and said polyethylene oxide has a number average molecular weight of 100,000–5,000,000 and the viscosity of the ink is 1,000–10,000 mPa·s (viscometer: ELD type viscometer, cone 3°R14 cone, rotation speed: 0.5 rpm, temperature: 20° C.).

30. An aqueous metallic ink composition as set forth in claim 29, wherein the polyethylene oxide is contained in 0.1–40% by weight with respect to the total amount of the ink composition.

* * * * *